(12) United States Patent
Baek et al.

(10) Patent No.: US 10,516,429 B2
(45) Date of Patent: Dec. 24, 2019

(54) VEHICLE FOR PERFORMING WIRELESS COMMUNICATION AND COMMUNICATION METHOD THEREOF

(71) Applicant: Samsung Electronics Co., Ltd., Suwon-si, Gyeonggi-do (KR)

(72) Inventors: Kwanghyun Baek, Hwaseong-si (KR); Yoongeon Kim, Suwon-si (KR); Taesik Yang, Suwon-si (KR); Juneyong Young, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/810,784

(22) Filed: Nov. 13, 2017

(65) Prior Publication Data

US 2018/0138935 A1 May 17, 2018

Related U.S. Application Data

(60) Provisional application No. 62/240,726, filed on Nov. 11, 2016.

(30) Foreign Application Priority Data

Dec. 30, 2016 (KR) .................. 10-2016-0184326

(51) Int. Cl.
*H04B 1/3822* (2015.01)
*H04B 7/06* (2006.01)
*H04B 7/0413* (2017.01)
*H04B 7/10* (2017.01)

(52) U.S. Cl.
CPC ......... *H04B 1/3822* (2013.01); *H04B 7/0602* (2013.01); *H04B 7/0689* (2013.01); *H04B 7/0413* (2013.01); *H04B 7/10* (2013.01)

(58) Field of Classification Search
CPC .................................................. H04B 1/3822
See application file for complete search history.

(56) References Cited

U.S. PATENT DOCUMENTS

| 5,771,456 | A | * | 6/1998 | Pon | .................. | G01S 19/22 |
| | | | | | | 455/456.2 |
| 6,744,823 | B1 | * | 6/2004 | Kamemura | ............ | G08G 1/094 |
| | | | | | | 375/267 |
| 2002/0196183 | A1 | * | 12/2002 | Lindenmeier | ........ | H04B 7/0808 |
| | | | | | | 342/374 |

(Continued)

OTHER PUBLICATIONS

Extended European Search Report dated Jul. 31, 2019, issued in a counterpart European application No. 17869478.2 - 1220 / 3494642.

*Primary Examiner* — Wen W Huang

(74) *Attorney, Agent, or Firm* — Jefferson IP Law, LLP

(57) ABSTRACT

A vehicle that performs wireless communication and a communication method thereof are provided. The vehicle that performs wireless communication includes a transceiver including a first radio frequency (RF) module placed in a first surface and a second RF module placed in a second surface of a plurality of surfaces forming an outer edge of the vehicle and a at least one processor that controls the transceiver to transmit and receive a wireless signal by using at least one of the first RF module or the second RF module, wherein each of the first RF module and the second RF module includes at least two antenna elements.

20 Claims, 14 Drawing Sheets

(56) References Cited

U.S. PATENT DOCUMENTS

| | | |
|---|---|---|
| 2009/0042529 A1 | 2/2009 | Lindenmeier et al. |
| 2009/0267842 A1* | 10/2009 | Takagi .................... H04B 1/18 343/702 |
| 2009/0310608 A1* | 12/2009 | Chen ...................... H04L 45/48 370/389 |
| 2010/0009636 A1* | 1/2010 | Hasegawa ............ H04L 1/0015 455/67.11 |
| 2010/0234071 A1* | 9/2010 | Shabtay ............... H04B 7/0408 455/562.1 |
| 2012/0033718 A1* | 2/2012 | Kauffman ........... H04B 1/3822 375/222 |
| 2012/0134279 A1 | 5/2012 | Tamaki |
| 2012/0258705 A1* | 10/2012 | Wisnewski ........... H04W 4/046 455/423 |
| 2013/0039271 A1 | 2/2013 | De La Garrigue |
| 2013/0191132 A1 | 7/2013 | Tanaka |
| 2014/0288774 A1* | 9/2014 | Morita .................. G01C 21/26 701/36 |
| 2014/0376455 A1 | 12/2014 | Autti et al. |
| 2015/0200691 A1* | 7/2015 | Ehrentraut ............ H04B 1/006 455/553.1 |
| 2016/0013839 A1 | 1/2016 | Song et al. |
| 2016/0064805 A1 | 3/2016 | Petrucci et al. |
| 2016/0280234 A1* | 9/2016 | Reilhac ................ B60K 35/00 |
| 2016/0293009 A1 | 10/2016 | Schuermeier |
| 2016/0324025 A1 | 11/2016 | Bustle et al. |

\* cited by examiner

VEHICLE FOR PERFORMING WIRELESS COMMUNICATION AND COMMUNICATION METHOD THEREOF

CROSS-REFERENCE TO RELATED APPLICATION(S)

This application claims the benefit under 35 U.S.C. § 119(e) of a U.S. Provisional application filed on Nov. 11, 2016 in the U.S. Patent and Trademark Office and assigned Ser. No. 62/420,726, and under 35 U.S.C. § 119(a) of a Korean patent application filed on Dec. 30, 2016 in the Korean Intellectual Property Office and assigned Serial number 10-2016-0184326, the entire disclosure of which is hereby incorporated by reference.

TECHNICAL FIELD

The present disclosure relates to a method and apparatus that perform wireless communication using at least one radio frequency (RF) module included in a vehicle.

BACKGROUND

Efforts are being made to develop an enhanced fifth generation (5G) communication system or a pre-5G communication system in order to satisfy increases in demand for wireless data traffic now that a fourth generation (4G) communication system is commercially available. A 5G communication system or a pre-5G communication system is referred to as a beyond 4G network communication system or a post long-term evolution (LTE) system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input multiple output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (COMP), and interference cancellation have been developed. In addition, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of the Internet from a human-based connection network in which a human generates and consumes information to an Internet of things (IoT) network that gives and receives and processes information to and from distributed constituent elements such as things has occurred. Internet of everything (IoE) technology in which big data processing technology through connection to a cloud server is combined with IoT technology has appeared. In order to implement the IoT, technology elements such as sensing technology, wired and wireless communication and network infrastructure, service interface technology, and security technology are required; thus, nowadays, research is being carried out on technology of a sensor network, machine to machine (M2M) communication, and machine type communication (MTC) for connection between things. In an IoT environment, an intelligent Internet technology service that collects and analyzes data generated in connected things to provide a new value to a human life may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts to apply a 5G communication system to an IoT network have been performed. For example, technologies such as a sensor network, M2M communication, and MTC have been implemented by the techniques of beamforming, MIMO, and array antenna, which are 5G communication technology. Application of a cloud RAN as the foregoing big data processing technology may be an example of fusion of 5G technology and IoT technology.

In 5G communication technology, a communication specification in an ultrahigh frequency band is considered, and in an ultrahigh frequency band, i.e., a frequency band of 30 GHz or more, because a wavelength is 10 mm or less, it is referred to as a mmWave band.

A largest characteristic of a mmWave band is that an electric wave loss according to a distance increases larger in a high frequency band than in a low frequency band. However, because a wavelength is also shortened, by applying beamforming using a high gain analog directional antenna of a multiple antenna, an electric wave loss can be overcome. Therefore, a beamforming design using a multiple antenna is important in mmWave band communication.

Nowadays, a research on a method of performing communication using an antenna installed in a vehicle has been continued.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of performing various communications according to a communication situation using a radio frequency (RF) module comprising at least two antenna elements included in a vehicle.

In accordance with an aspect of the present disclosure, a vehicle that performs wireless communication is provided. The vehicle includes a transceiver comprising a first RF module placed in a first surface and a second RF module placed in a second surface of a plurality of surfaces forming an outer edge of the vehicle and at least one processor that controls the transceiver to transmit and receive a wireless signal by using at least one of the first RF module or the second RF module, wherein each of the first RF module and the second RF module includes at least two antenna elements.

In accordance with another aspect of the present disclosure, a communication method of a vehicle that performs wireless communication is provided. The method includes controlling a transceiver comprising a first RF module and a second RF module to transmit and receive a wireless signal by using at least one of the first RF module placed in a first surface or the second RF module placed in a second surface of a plurality of surfaces forming an outer edge of the vehicle, wherein each of the first RF module and the second RF module includes at least two antenna elements.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
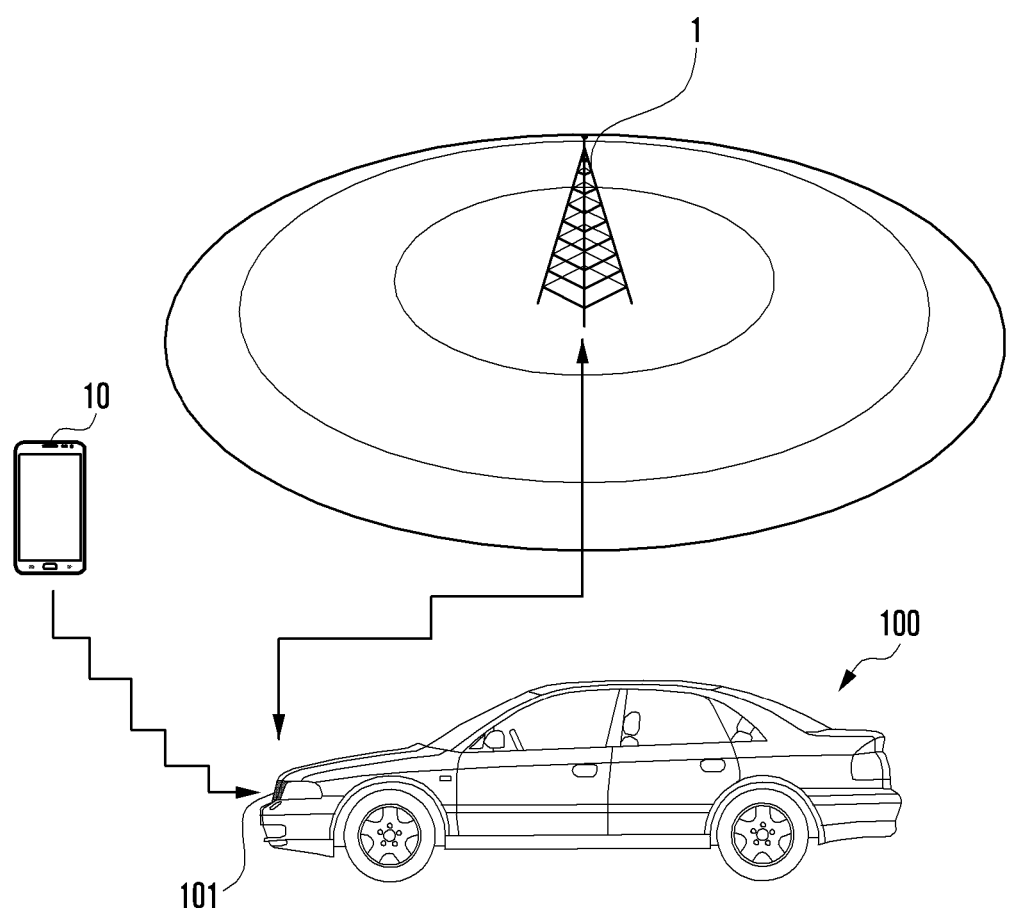
FIG. 1 is a conceptual diagram illustrating a vehicle that communicates with a base station and a terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, it may be understood that each block of a flowchart and combinations of the flowchart may be performed by computer program instructions. Because these computer program instructions may be mounted in a processor of a universal computer, a special computer, or other programmable data processing equipment, the instructions performed through a processor of a computer or other programmable data processing equipment generate a means that performs functions described in a block(s) of the flowchart. In order to implement a function with a specific method, because these computer program instructions may be stored at a computer available or computer readable memory that can direct a computer or other programmable data processing equipment, instructions stored at the computer available or computer readable memory may produce a production item including an instruction means that performs a function described in block(s) of the flowchart. Because computer program instructions may be mounted on a computer or other programmable data processing equipment, a series of operations are performed on the computer or other programmable data processing equipment and generate a process executed with the computer, and instructions that direct the computer or other programmable data processing equipment may provide operations for executing functions described in block(s) of the flowchart.

Further, each block may represent a portion of a module, segment, or code including at least one executable instruction for executing a specific logical function(s). Further, in several replaceable execution examples, it should be noted that functions described in blocks may be performed regardless of order. For example, two consecutively shown blocks may be substantially simultaneously performed or may be sometimes performed in reverse order according to a corresponding function.

In this case, a term "-unit" used in the present embodiment means a software or hardware component such as field-programmable gate array (FPGA) or application-specific integrated circuit (ASIC) and performs any function. However, "-unit" is not limited to software or hardware. A "-unit" may be configured to store at a storage medium that can address and may be configured to reproduce at least one processor. Therefore, "-unit" includes, for example, components (such as software components, object-oriented software components, class components, and task components), processes, functions, attributes, procedures, subroutines, segments of a program code, drivers, firmware, microcode, circuit, data, database, data structures, tables, arrays, and variables. A function provided within constituent elements and "-units" may be performed by coupling the smaller number of constituent elements and "-units" or by subdividing the constituent elements and "-units" into additional constituent elements and "-units". Further, constituent elements and "-units" may be implemented in a manner to reproduce at least one central processing unit (CPU) within a device or a security multimedia card.

FIG. 1 is a conceptual diagram illustrating a vehicle that communicates with a base station and a terminal according to an embodiment of the present disclosure.

Referring to FIG. 1, a vehicle 100 according to an embodiment of the present disclosure may include at least one radio frequency (RF) module 101 for receiving a wireless signal from the outside and transmitting a wireless signal to the outside and communicate with at least one of a base station 1 and a terminal 10 using the RF module.

The vehicle 100 according to an embodiment of the present disclosure may include an RF module 101 in one area of a front bumper thereof. However, unlike the drawing, the vehicle 100 according to an embodiment of the present disclosure may include at least one RF module in at least one surface of a plurality of surfaces forming an outer edge thereof. The RF module 101 according to an embodiment of the present disclosure may be, for example, attached to a metal structure forming an outer edge of the vehicle or mounted within a metal structure. That is, in order to transmit and receive a wireless signal emitted in various directions for communication according to various communication methods of the vehicle 100 according to an embodiment of the present disclosure, a position and the number of the RF module 101 disposed at the vehicle may be variously determined.

A vehicle according to an embodiment of the present disclosure may perform various communication according to a vehicle state using at least one RF module included therein. For example, the controller of the vehicle may determine a communication method most appropriate to a current state of the vehicle and control an RF unit to perform communication according to the determined communication method.

Hereinafter, a communication method of a vehicle based on a vehicle state according to an embodiment of the present disclosure will be described in detail with reference to the drawings attached to this specification.

Figure 2A:
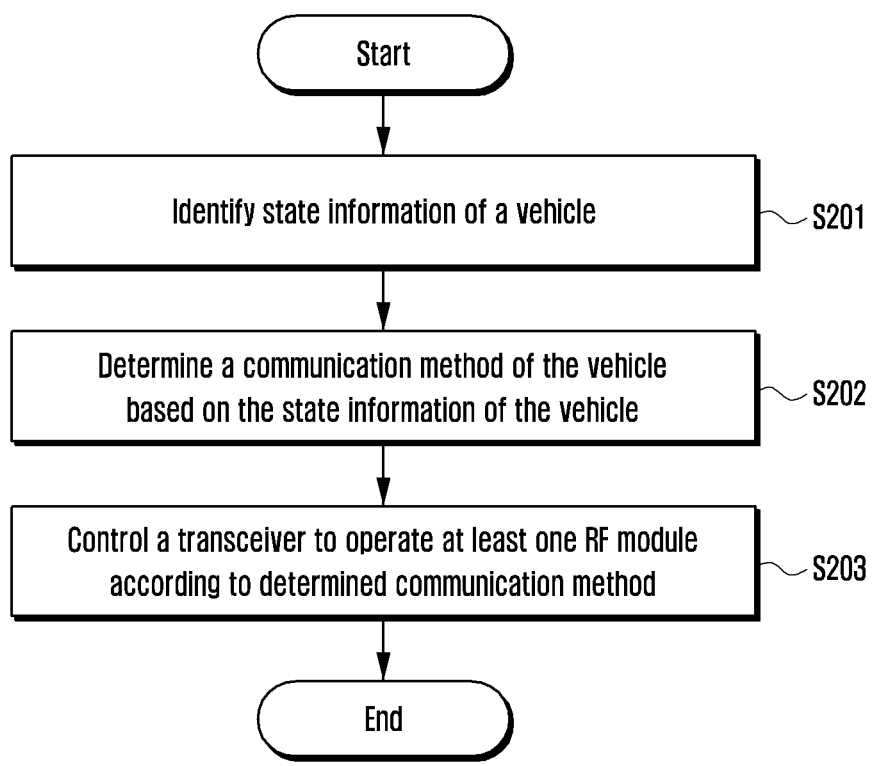
FIG. 2A is a flowchart illustrating a communication method of the vehicle according to an embodiment of the present disclosure.
Figure 2B:
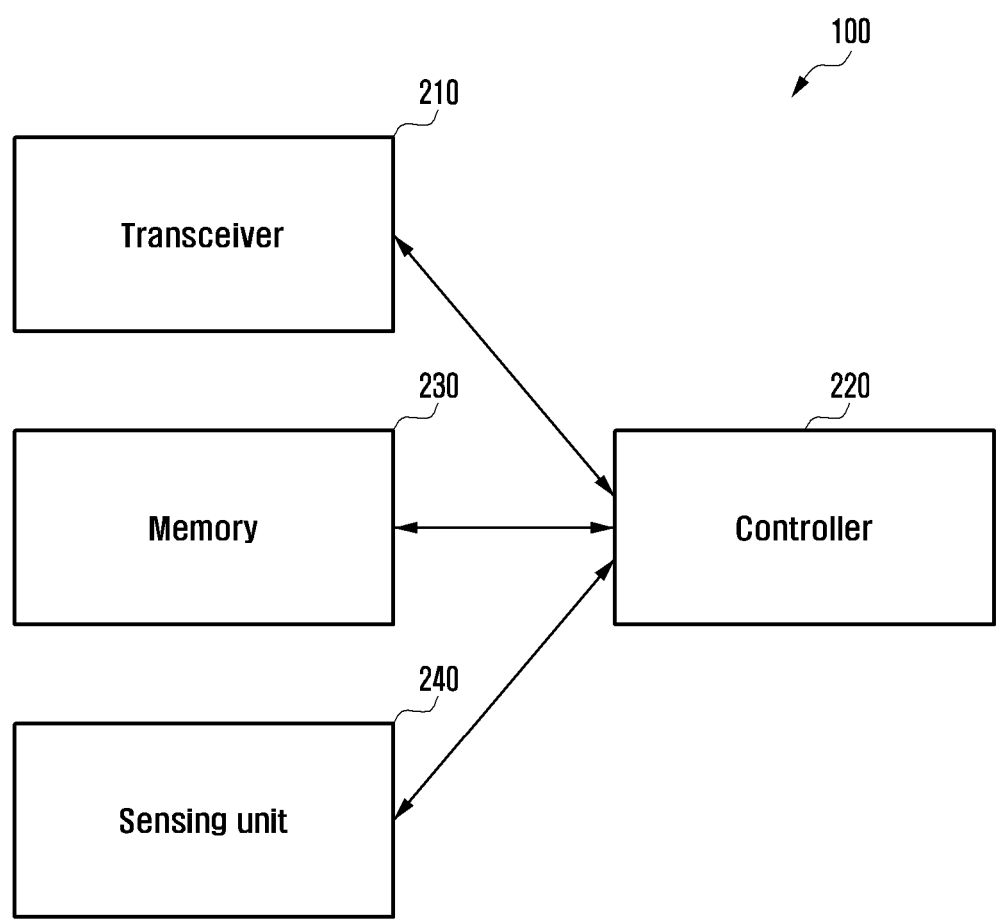
FIG. 2B is a block diagram illustrating an internal configuration of a vehicle according to an embodiment of the present disclosure.

FIG. 2A is a flowchart illustrating a communication method of the vehicle according to an embodiment of the present disclosure, and FIG. 2B is a block diagram illustrating an internal configuration of a vehicle according to an embodiment of the present disclosure.

Referring to FIG. 2A, in order to determine a current state of the vehicle, the vehicle according to an embodiment of the present disclosure may acquire state information thereof at operation S201.

Here, state information of the vehicle is an entire kind of information for determining a current state of the vehicle and may include, for example, a driving speed, driving mode, driving environment, driving route of the vehicle, and information related to a component operation of the vehicle.

Referring to FIG. 2B, the controller 220 of the vehicle according to an embodiment of the present disclosure may acquire state information of the vehicle from various configurations included in the vehicle.

For example, the controller 220 (e.g., at least one processor) of the vehicle may continuously receive position information of the vehicle from the RF unit 210 and acquire driving route information of the vehicle or acquire driving environment information of the vehicle based on weather information and road situation information received from the outside. Further, for example, the controller 220 of the vehicle may identify driving speed information of the vehicle, operation information (e.g., whether a wiper of the vehicle operates, whether a sun roof of the vehicle is opened) of a vehicle component, driving environment information (temperature difference or humidity difference between the outside and the inside of the vehicle) of the vehicle, and driving mode information (manual driving mode driven by a driver or automatic driving mode for self-driving) of the vehicle from a sensing unit 240 (e.g., at least one sensor).

In this way, when state information of the vehicle is acquired, the controller of the vehicle according to an embodiment of the present disclosure may determine a communication method of the vehicle based on the identified vehicle state information at operation S202.

Here, a communication method of the vehicle may be changed according to the number and a position of RF modules disposed at the vehicle. For example, when one RF module is disposed at each of different surfaces forming an outer edge of the vehicle, the controller 220 of the vehicle may determine to perform communication with any one method of single input single output (SISO) communication, SISO and diversity communication, and multiple input multiple output (MIMO) communication according to a vehicle state. Alternatively, when two RF modules are disposed at each of different surfaces forming an outer edge of the vehicle, the controller 220 of the vehicle may determine to perform communication with any one method of SISO communication, SISO and diversity communication, MIMO communication, and MIMO and diversity communication according to a vehicle state.

In a more detailed example, when a controller 220 according to an embodiment of the present disclosure acquires running speed information of the vehicle, if a running speed of the vehicle is a first speed, the controller 220 may determine to perform SISO communication, and if a running speed of the vehicle is a second speed faster than a first speed, the controller 220 may determine to perform MIMO communication. Here, the first speed may be a speed included in a speed range of a vehicle in which a driver transmits and receives data in an average transmission speed in a mobile communication system. Further, the second speed is a speed faster by a predetermined magnitude or more than the first speed and may be determined based on a level in which a receiving rate of a wireless signal transmitting from the base station is deteriorated or a level in which the handover execution number increases. Information about a reference of the first speed and the second speed according to an embodiment of the present disclosure may be previously stored at a memory unit 230 (e.g., a storage) of FIG. 2B.

In another example, the controller 220 according to an embodiment of the present disclosure may acquire driving mode information of the vehicle. Here, a driving mode of the vehicle may include, for example, a manual driving mode and an automatic driving mode. More specifically, the manual driving mode may mean a driving mode in which the vehicle is driven by a driver, and the automatic driving mode may be a driving mode in which the vehicle performs self-driving driven by the controller thereof. That is, the automatic driving mode may be a driving mode that recognizes a position of the vehicle through a sensor attached to the vehicle and that runs while avoiding an obstacle or that runs while adjusting a vehicle speed based on running information of adjacent vehicles or current driving environment information of the vehicle collected from the RF unit 210.

In this case, when a driving mode of the vehicle is a manual driving mode, the controller 220 of the vehicle may determine to perform SISO communication. Further, when a driving mode of the vehicle is an automatic driving mode, in order to receive a plurality of state information (e.g., speed information or driving route information of adjacent vehicles) of adjacent vehicles from each of the adjacent vehicles, the controller 220 according to an embodiment of the present disclosure may determine to perform MIMO communication.

In another example, the controller 220 according to an embodiment of the present disclosure may acquire driving route information of the vehicle, and when a moving direction of the vehicle according to an acquired vehicle estimated route advances to a specific region, the controller 220 may determine to perform diversity communication. In this case, the controller 220 of the vehicle may acquire destination information of the vehicle through a navigation module (not shown) and determine whether a specific region is included in an estimated route toward a destination of the vehicle.

In this case, when the vehicle is performing SISO communication, the controller 220 according to an embodiment of the present disclosure may determine to perform SISO and diversity communication, and when the vehicle is performing MIMO communication, the controller 220 may determine to perform MIMO and diversity communication. Here, a specific region is a region of a high probability in which multipath fading of a signal or polarization miss of an antenna is to occur when performing communication and may include, for example, a forest or a mountain region. At the memory unit 230 according to an embodiment of the present disclosure, map information and position information about a specific region may be stored.

In another example, the controller 220 according to an embodiment of the present disclosure may acquire information about an operation of a vehicle component. For example, when detection information about a wiper operation of the vehicle is acquired from the sensing unit 240, the controller 220 of the vehicle may determine to perform MIMO communication in consideration of an attenuation rate of a wireless signal according to weather. In this case, when the vehicle is performing SISO communication, the controller 220 according to an embodiment of the present disclosure may change a communication method to perform MIMO communication. Further, in this case, the controller 220 according to an embodiment of the present disclosure may determine to perform MIMO communication in consideration of information of a temperature difference or a humidity difference between the outside and the inside of the vehicle from the sensing unit 240 in addition to information about a vehicle component.

In the foregoing various embodiments, an example has been described in which the controller 220 according to an embodiment of the present disclosure determines a communication method of the vehicle based on state information of the vehicle, but by combining two or more state information, a communication method of the vehicle may be determined.

Further, when a vehicle state is changed based on state information of the vehicle while performing any one communication method, the controller 220 according to an embodiment of the present disclosure may change a determined communication method. For example, while performing SISO communication or MIMO communication according to a driving mode of the vehicle, when a specific region is included in an estimated driving route of the vehicle, the controller 220 according to an embodiment of the present disclosure may change a communication method determined to perform SISO and diversity communication or MIMO and diversity communication.

In this way, when the controller 220 according to an embodiment of the present disclosure determines a communication method of the vehicle, the controller 220 may control the RF unit 210 to operate at least one RF module disposed at the vehicle according to the determined communication method at operation S203.

In this case, when performing communication according to a determined communication method, operation may be changed in which the controller 220 according to an embodiment of the present disclosure controls an RF unit according to a method and the number in which at least one RF module is disposed at the vehicle. A more detailed operation control method of the RF unit related thereto will be described hereinafter with reference to the attached drawings.

Figure 3A:
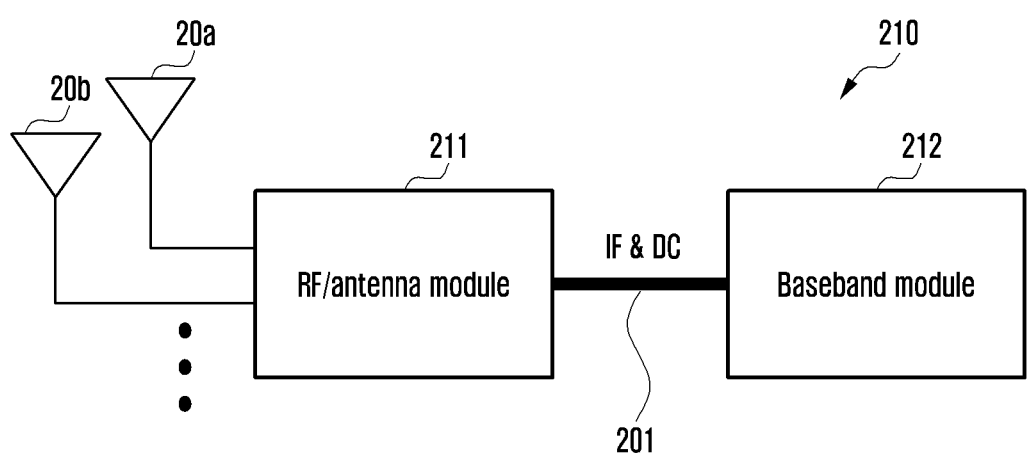
FIG. 3A is a block diagram illustrating a radio frequency (RF) unit that performs communication of a vehicle according to an embodiment of the present disclosure.
Figure 3B:
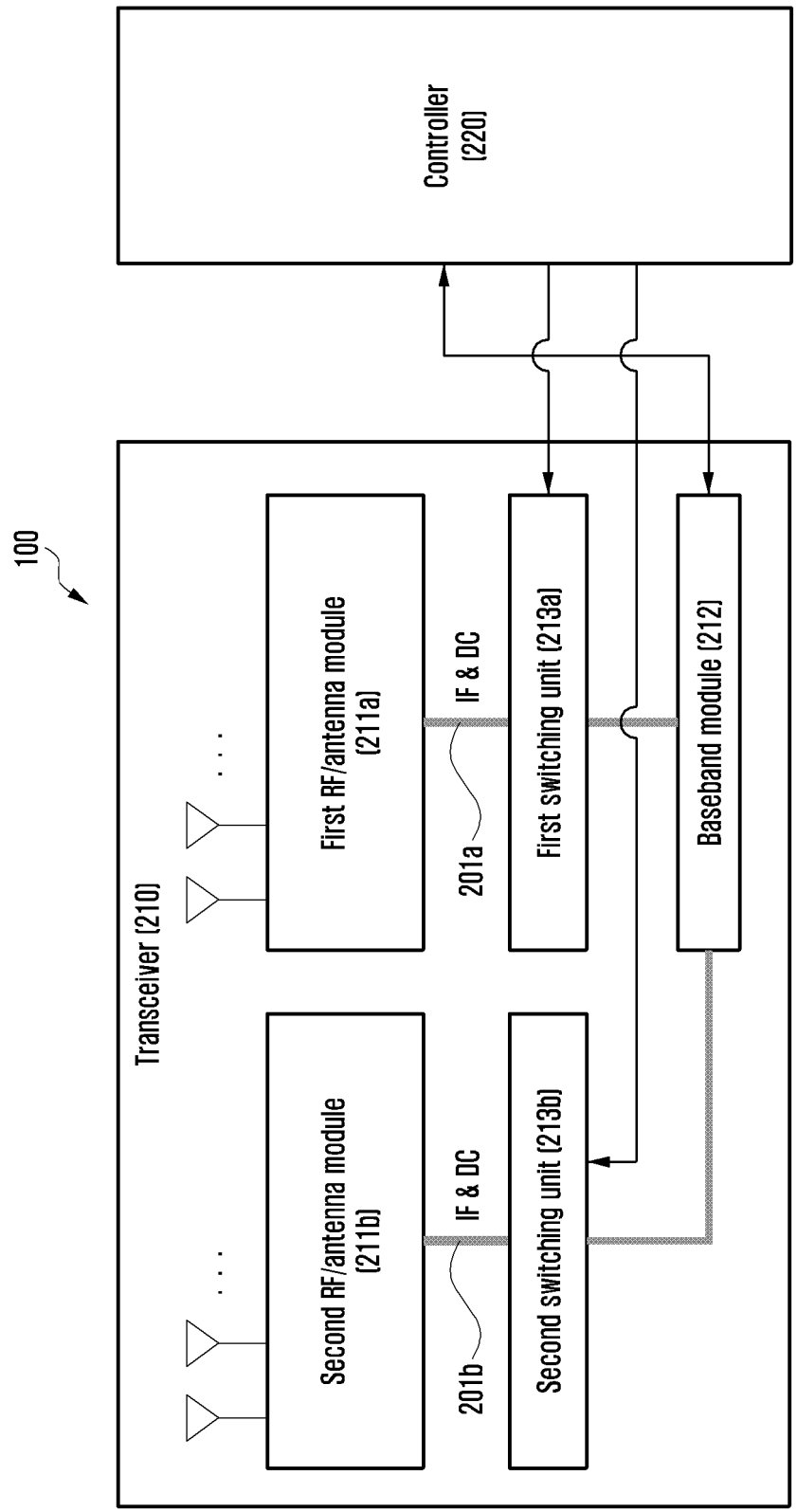
FIG. 3B is a block diagram illustrating an RF unit and a controller that perform communication of a vehicle according to an embodiment of the present disclosure.
Figure 3C:
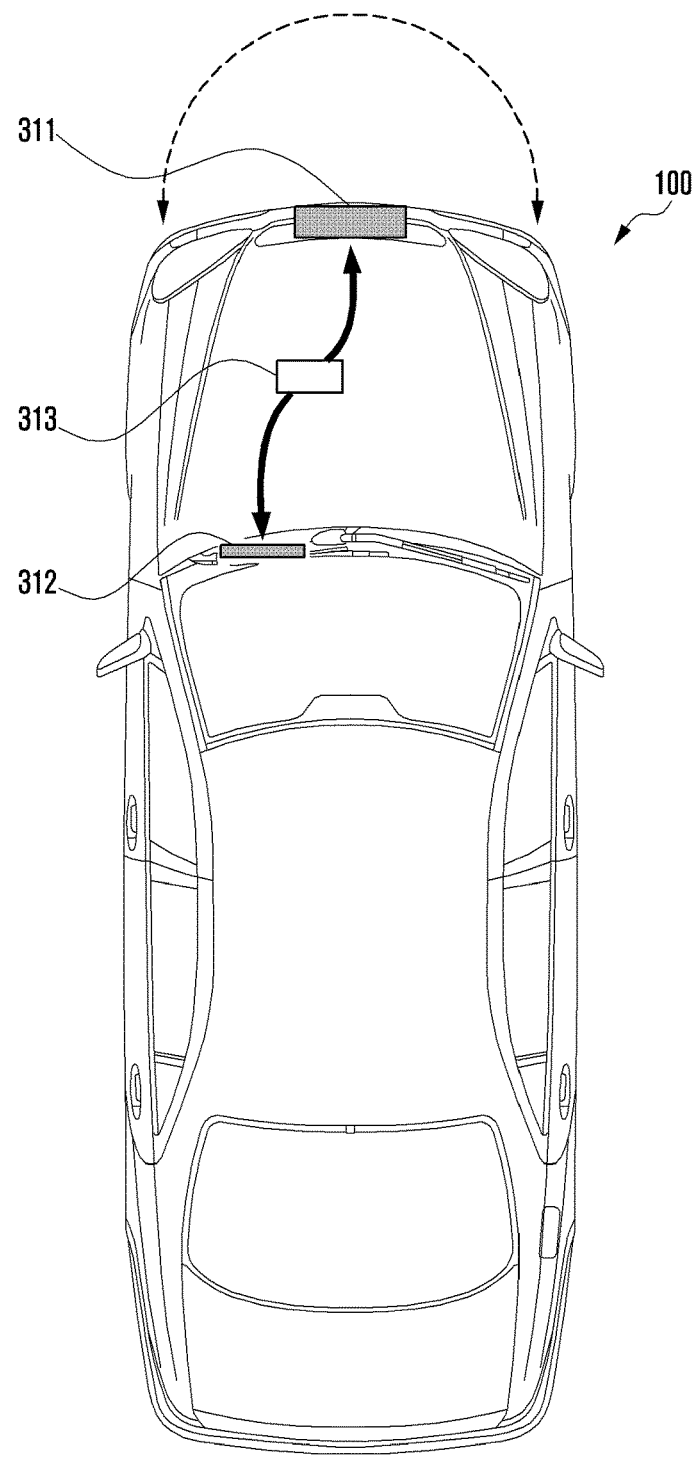
FIG. 3C is a diagram illustrating an example in which one RF module is placed in a vehicle according to an embodiment of the present disclosure.

FIG. 3A is a block diagram illustrating an RF unit that performs communication of a vehicle according to an embodiment of the present disclosure, FIG. 3B is a block diagram illustrating an RF unit and a controller that perform communication of a vehicle according to an embodiment of the present disclosure, and FIG. 3C is a diagram illustrating an example in which one RF module is disposed in a vehicle according to an embodiment of the present disclosure.

Referring to FIG. 3A, the vehicle 100 according to an embodiment of the present disclosure may include an RF unit for performing communication.

The RF unit 210 according to an embodiment of the present disclosure may include an RF module 211, a baseband module 212, and a cable 201 that connects the RF module 211 and the baseband module 212.

The RF module 211 according to an embodiment of the present disclosure may include at least two antenna elements 20*a* and 20*b* that can receive a wireless signal (electronic waves) received from the outside or that can transmit a wireless signal to the outside. FIG. 3A illustrates an example in which two antenna elements are included in one RF module 211, but the RF module according to an embodiment of the present disclosure may include at least two antenna elements.

The antenna elements 20*a* and 20*b* each included in one RF module 211 according to an embodiment of the present disclosure may receive the same wireless signal or may emit the same wireless signal. In this way, because a plurality of antenna elements each included in one RF module according to an embodiment of the present disclosure may transmit and receive the same wireless signal, a communication distance of a moving vehicle can increase and transmission efficiency can be enhanced.

Although not shown in the drawing, the RF module 211 according to an embodiment of the present disclosure may include a radio frequency integrated circuit (RFIC) into which a power amp (PA), low noise amp (LNA), filter, and mixer are incorporated.

The cable 201 according to an embodiment of the present disclosure may perform a passage function that transfers a wireless signal received through an antenna element to the baseband module 212. In this case, a signal down-converted through a mixer of the RF module 211 is transferred to the baseband module 212 through the cable 201.

The baseband module 212 according to an embodiment of the present disclosure may include an RFIC including an analog-to-digital converter (ADC). Further, the baseband module 212 may analyze digital data including channel information and process and control a final signal corresponding to a wireless signal received from the outside or a final signal to transmit to the outside.

In the cable 201, which is a path between the baseband module 212 and the RF module 211, a switching unit for connecting or opening the path may be additionally disposed.

Referring to FIG. 3B, a first switching unit 213a for connecting or opening a first path may be disposed between a first RF module 211a and the baseband module 212, and a second switching unit 213b for connecting or opening a second path may be included between a second RF module 211b and the baseband module 212. FIG. 3B illustrates an example in which two switching units are included, but when three or more RF modules are provided according to an embodiment of the present disclosure, three or more switching units for connecting or opening paths between RF modules and a baseband module may be provided to correspond thereto.

The controller 220 according to an embodiment of the present disclosure shown in FIG. 3B may determine a communication method of the vehicle according to a vehicle state determined based on state information of the vehicle and control the RF unit 210 such that the RF module transmits and receives a wireless signal based on the determined communication method. More specifically, the controller 220 according to an embodiment of the present disclosure may determine to perform SISO communication based on state information of the vehicle and control one switching unit to connect a path between one RF module and a baseband module to correspond thereto. In another example, the controller 220 according to an embodiment of the present disclosure may determine to perform SISO and diversity communication based on state information of the vehicle and control a switching unit to connect or open paths between at least one RF module and a baseband module to correspond thereto.

Referring to FIG. 3C, the RF module according to an embodiment of the present disclosure may be disposed in at least one surface of surfaces forming an outer edge of the vehicle 100. FIG. 3C illustrates an example in which an RF module 311 is disposed at one surface corresponding to the front side of the vehicle 100, but the RF module may be disposed at one surface corresponding to another direction (side portion or the rear side) among the surfaces.

Referring to FIG. 3C, when the vehicle 100 according to an embodiment of the present disclosure includes one RF module 311 (hereinafter, referred to as a first RF module), the vehicle 100 may perform SISO communication. In this case, the controller according to an embodiment of the present disclosure may control a first switching unit 313 to connect a first path between the first RF module 311 and a baseband module 312.

In this case, a wireless signal transmitted from the outside may be received from each of antenna elements included in the first RF module 311. Further, when the vehicle 100 has predetermined data to transmit to an external base station or a terminal, a wireless signal including the data may be transmitted from each of antenna elements included in the first RF module 311.

A vehicle according to an embodiment of the present disclosure may include a plurality of RF modules disposed in at least two surfaces of a plurality of surfaces forming an outer edge thereof.

Figure 4:
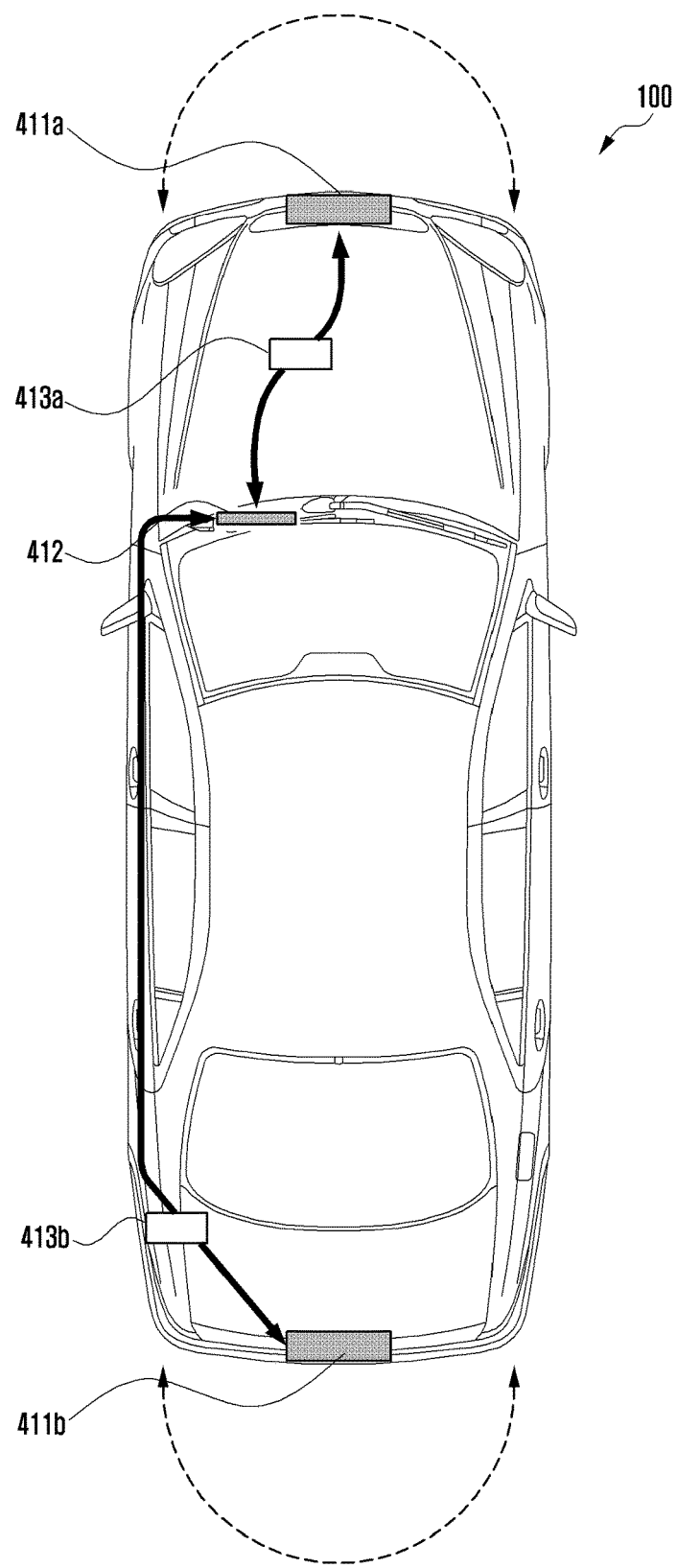
FIG. 4 is a diagram illustrating a vehicle in which two RF modules are placed according to an embodiment of the present disclosure.

FIG. 4 is a diagram illustrating a vehicle in which two RF modules are disposed according to an embodiment of the present disclosure.

Referring to FIG. 4, the vehicle 100 according to an embodiment of the present disclosure may include a first RF module 411a disposed at a first surface (e.g., a surface corresponding to a front bumper of the vehicle) and a second RF module 411b disposed at a second surface (e.g., a surface corresponding to a rear bumper of the vehicle) of a plurality of surfaces forming an outer edge thereof.

As described above, the first RF module 411a and the second RF module 411b each may include a plurality of antenna elements. Here, the first RF module 411a and the second RF module 411b may transmit and receive a wireless signal in an angle of 0° to 180° using each of a first surface and a second surface as a reference surface.

For example, as shown in FIG. 4, when the first RF module 411a is disposed at one surface corresponding to the front side of the vehicle and when the second RF module 411b is disposed at one surface corresponding to the rear side of the vehicle, the sum of transmitting and receiving ranges of each of the first RF module 411a and the second RF module 411b may be 0° to 360°. Therefore, when the first RF module 411a and the second RF module 411b are disposed in this way, a wireless signal transmitted in various directions can be received, and a wireless signal can be emitted in various directions.

The controller according to an embodiment of the present disclosure may determine a current state of the vehicle based on acquired vehicle state information and determine a communication method of the vehicle based on the determined current state. For example, when the controller according to an embodiment of the present disclosure determines to perform SISO communication based on state information of the vehicle, the controller may control a first switching unit 413a to connect a first path between the first RF module 411a and a baseband module 412 and control a second switching unit 413b to open a second path between the second RF module 411b and the baseband module 412. In this case, a wireless signal may be transmitted and received by only the first path. In the present embodiment, an example of performing SISO communication using the first RF module 411a positioned at the front side of the vehicle has been described, but the controller may perform SISO communication using the second RF module 411b.

In another example, when the controller according to an embodiment of the present disclosure determines to perform SISO and diversity communication based on state information of the vehicle, the controller may control the first switching unit 413a to connect a first path and control the second switching unit 413b to connect a second path.

More specifically, in a state in which the controller of the vehicle performs SISO communication through the first path and the first RF module 411a disposed at the front side of the vehicle, if multipath fading has occurred in a wireless signal received through the first RF module 411a, a case of controlling the second switching unit 413b to operate together with the second RF module 411b disposed at the rear side of the vehicle has been described. That is, the controller of the vehicle according to an embodiment of the present disclosure may sequentially control the first switching unit 413a and the second switching unit 413b to connect the second path after the first path is connected.

Further, for example, when SISO and diversity communication according to an embodiment of the present disclosure is performed, the same wireless signal may be transmitted and received through each of the first path and the second path (space diversity communication). Further, for example, when SISO and diversity communication according to an embodiment of the present disclosure is performed, a component (e.g., horizontally polarized wave) having first directionality of a wireless signal may be transmitted and received through the first path, and a component (e.g., vertically polarized ware) having second directionality of a wireless signal may be transmitted and received through the second path (polarization diversity).

In another example, when the controller according to an embodiment of the present disclosure determines to perform MIMO communication based on state information of the vehicle, the controller may control the first switching unit 413a to connect a first path and control the second switching unit 413b to connect the second path. In this case, a wireless signal transmitted and received through the first path and a wireless signal transmitted and received through the second path may be different signals.

In this way, the controller according to an embodiment of the present disclosure may determine a current state of the vehicle and connect or open a path between RF modules and a baseband module in order to perform a communication method most appropriate to a determined state, thereby performing more efficient communication.

FIG. 4 illustrates an example in which the first RF module 411a and the second RF module 411b are disposed at a surface corresponding to the front side of the vehicle and a surface corresponding to the rear side, but the first RF module and the second RF module may be disposed at various positions.

Figure 5A:
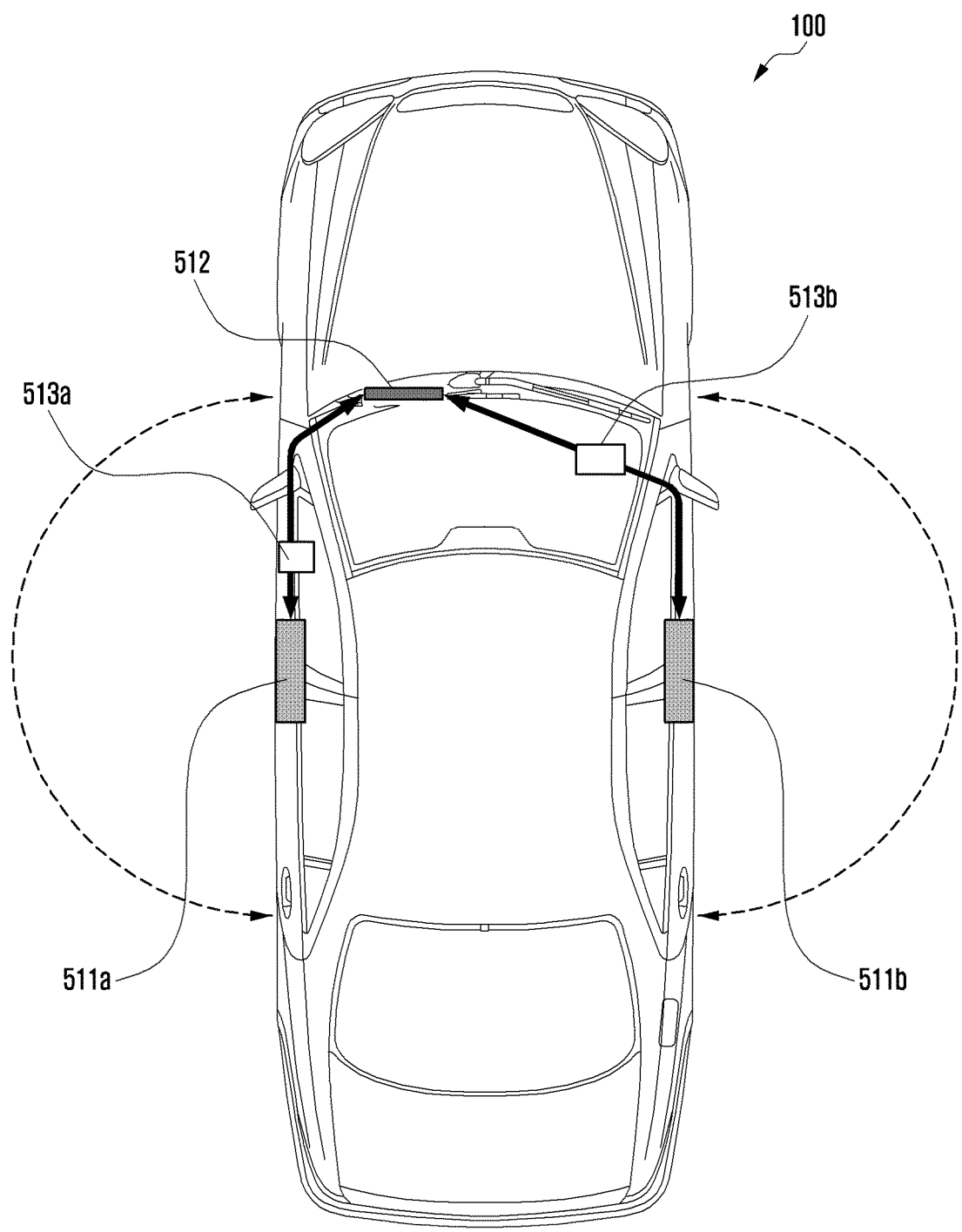
FIGS. 5A and 5B are diagrams illustrating a vehicle in which a first RF module and a second RF module are placed according to an embodiment of the present disclosure.
Figure 5B:
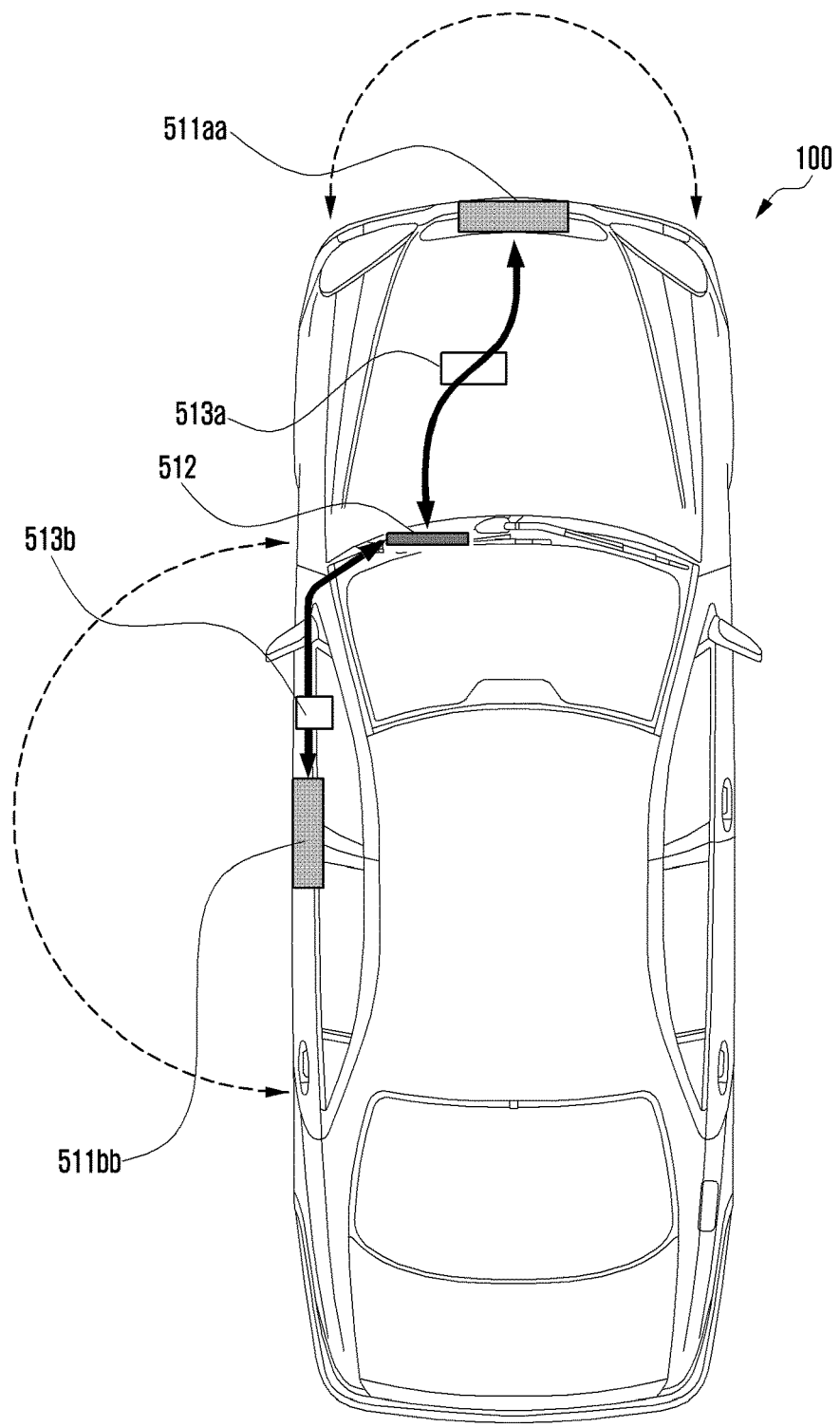

FIGS. 5A and 5B are diagrams illustrating a vehicle in which a first RF module and a second RF module are disposed according to an embodiment of the present disclosure.

Referring to FIG. 5A, a first RF module 511a according to an embodiment of the present disclosure may be disposed at one surface corresponding to a side portion of the vehicle, and a second RF module 511b may be disposed at another one surface corresponding to a side portion of the vehicle. In this way, when a surface in which the first RF module 511a is disposed and a surface in which the second RF module 511b is disposed are parallel to each other, a transmitting and receiving range according to the first RF module 511a and the second RF module 511b may have an angle of 0° to 360°.

Alternatively, referring to FIG. 5B, the first RF module 511a may be disposed at one surface corresponding to the front side of the vehicle, and the second RF module 511b may be disposed at one surface corresponding to a side portion of the vehicle. In this case, a transmitting and receiving range according to the first RF module 511a and the second RF module 511b may have an angle of 0° to 270°.

In the RF module, as a path between baseband modules is extended, a transition loss may increase. However, as in a case of FIGS. 5A and 5B, when RF modules each are disposed, a distance between the RF module and the baseband module is shortened, and a loss occurring when transferring a wireless signal can be reduced.

Although not shown in the drawing, a vehicle according to an embodiment of the present disclosure may further include a third RF module disposed parallel to a first RF module at a first surface. Further, a vehicle according to an embodiment of the present disclosure may further include a third switching unit for connecting or opening a third path between the third RF module and a baseband module. In this case, a vehicle according to an embodiment of the present disclosure may perform the above-described SISO communication, SISO and diversity communication, and MIMO communication using the first RF module, the second RF module, and the third RF module.

For example, the controller according to an embodiment of the present disclosure may determine to perform SISO communication based on state information of the vehicle. In this case, the controller according to an embodiment of the present disclosure may control a first switching unit to connect a first path and control a second switching unit to open a second path. In this case, the controller according to an embodiment of the present disclosure may control the first switching unit to the third switching unit to perform SISO communication through the second path or the third path.

In another example, when the controller according to an embodiment of the present disclosure determines to perform SISO and diversity communication based on state information of the vehicle, the controller may control a first switching unit to connect a first path and control a second switching unit to connect the second path. In this case, the controller according to an embodiment of the present disclosure may control the first switching unit to the third switching unit to perform SISO and diversity communication through the second path and the third path.

In another example, when the controller according to an embodiment of the present disclosure determines to perform MIMO communication based on state information of the vehicle, the controller may control a first switching unit to connect a first path, control a second switching unit to connect a second path, and control a third switching unit to open a third path. In this case, a wireless signal transmitted and received through the first path and a wireless signal transmitted and received through the second path may be different signals. Alternatively, the controller according to an embodiment of the present disclosure may control a first switching unit to connect a first path, control a second switching unit to open a second path, and control a third switching unit to connect a third path. Similarly, a wireless signal transmitted and received through the first path and the third path may be different wireless signals.

Hereinafter, when a plurality of RF modules is disposed at a first surface and when a plurality of RF modules is disposed at a second surface, a communication method of the vehicle according to an embodiment of the present disclosure will be described.

Figure 6A:
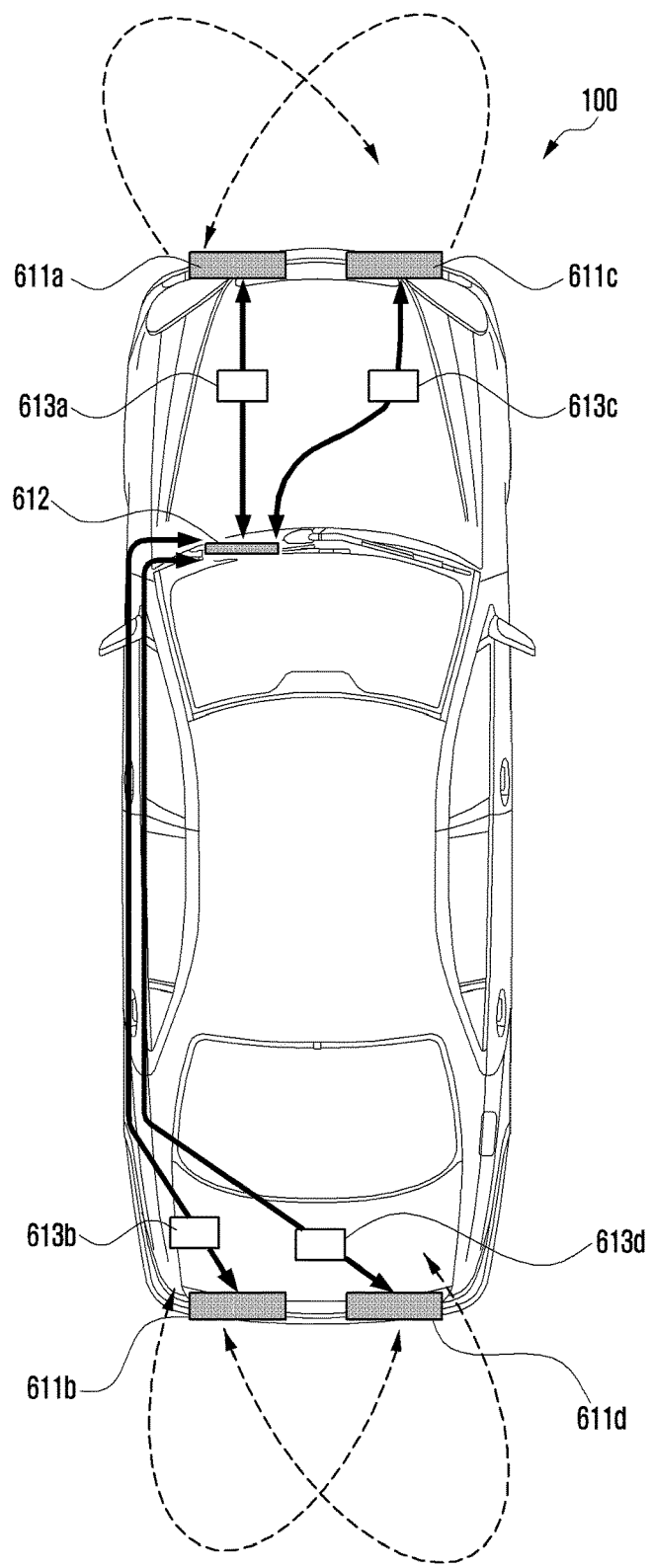
FIG. 6A is a diagram illustrating a vehicle in which two RF modules are placed in a first surface and in which two RF modules are placed in a second surface according to an embodiment of the present disclosure.
Figure 6B:
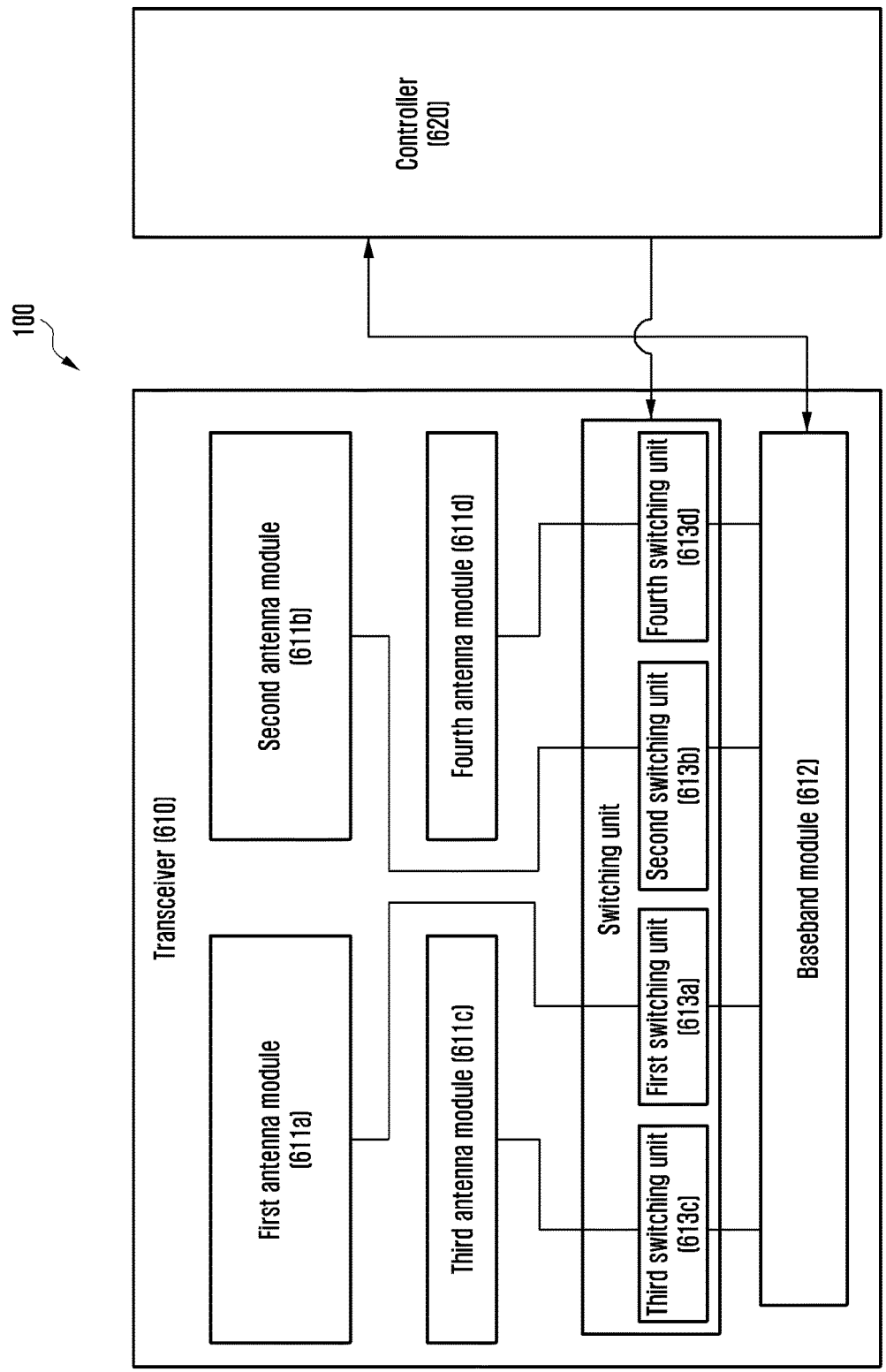
FIG. 6B is a block diagram illustrating an internal configuration of the vehicle of FIG. 6A according to an embodiment of the present disclosure.

FIG. 6A is a diagram illustrating a vehicle in which two RF modules are disposed at a first surface and in which two RF modules are disposed at a second surface according to an embodiment of the present disclosure, and FIG. 6B is a block diagram illustrating an internal configuration of the vehicle of FIG. 6A according to an embodiment of the present disclosure.

Referring to FIG. 6A, the vehicle 100 according to an embodiment of the present disclosure may include a first RF module 611a and third RF module 611c disposed at a first surface and a second RF module 611b and fourth RF module 611d disposed at a second surface. In this case, as shown in FIG. 6B, an RF unit 610 may further include a first switching unit 613a for connecting or opening a first path between the first RF module 611a and a baseband module 612, a second switching unit 613b for connecting or opening a second path between the second RF module 611b and the baseband module 612, a third switching unit 613c for connecting or opening a third path between the third RF module 611c and the baseband module 612, and a fourth switching unit 613d for connecting or opening a fourth path between the fourth RF module 611d and the baseband module 612.

A controller 620 (e.g., at least one processor) according to an embodiment of the present disclosure may determine a current state of the vehicle based on acquired vehicle state information, determine a communication method most appropriate to a current state of the vehicle, and control a switching operation of the first switching unit to the fourth switching unit 613a, 613b, 613c, and 613d.

For example, when the controller 620 according to an embodiment of the present disclosure determines to perform SISO communication based on state information of the vehicle, the controller 620 may control the first switching unit 613a to connect a first path, control the second switching unit 613b to open a second path, control the third switching unit 613c to open a third path, and control the fourth switching unit 613d to open a fourth path. In this case, a wireless signal may be transmitted and received by only the first path. In the present embodiment, an example of performing SISO communication using the first RF module 611a has been described, but the controller 620 may control the first switching unit to the fourth switching unit 613a, 613b, 613c, and 613d to perform SISO communication through any one path of the second path to the fourth path.

In another example, when the controller 620 according to an embodiment of the present disclosure determines to perform SISO and diversity communication based on state information of the vehicle, the controller 620 may control the first switching unit 613a to connect a first path, control the second switching unit 613b to connect a second path, control the third switching unit 613c to open a third path, and control the fourth switching unit 613d to open a fourth path.

In this case, for example, the same wireless signal may be transmitted and received through each of the first path and the second path (space diversity communication). Further, for example, a component (e.g., horizontally polarized wave) having first directionality of a wireless signal may be transmitted and received through the first path, and a component (e.g., vertically polarized ware) having second directionality of a wireless signal may be transmitted and received through the second path (polarization diversity).

In SISO and diversity communication according to the present embodiment, a case has been described in which the first path and the second path are connected, but the controller 620 may control the first switching unit to the fourth switching unit 613a, 613b, 613c, and 613d to connect the first path and the fourth path, the second path and the third path, or the third path and the fourth path to perform SISO and diversity communication.

In another example, when the controller 620 according to an embodiment of the present disclosure determines to perform MIMO communication based on state information of the vehicle, the controller 620 may control the first switching unit 613a to connect a first path, control the second switching unit 613b to open a second path, control the third switching unit 613c to connect a third path, and control the fourth switching unit 613d to open a fourth path. In this case, a wireless signal transmitted and received through the first path and a wireless signal transmitted and received through the third path may be different signals. In the present embodiment, a case has been described in which the first path and the third path are connected, but the controller 620 according to an embodiment of the present disclosure may connect the first path and the second path, connect the third path and the fourth path, or connect the second path and the fourth path to perform MIMO communication.

In another example, when the controller 620 according to an embodiment of the present disclosure determines to perform MIMO and diversity communication based on state information of the vehicle, the controller 620 may control the first switching unit 613a to connect a first path, control the second switching unit 613b to connect a second path, control the third switching unit 613c to connect a third path, and control the fourth switching unit 613d to connect a fourth path. In this case, a wireless signal transmitted and received through the first path and the second path and a wireless signal transmitted and received through the third path and the fourth path may be different signals. In a more detailed example, a first wireless signal may be transmitted and received through the first path and the second path, and a second wireless signal may be transmitted and received through the third path and the fourth path.

In MIMO and diversity communication according to the present embodiment, a case of transmitting and receiving a first wireless signal through the first path and the second path and transmitting and receiving a second wireless signal through the third path and the fourth path has been described, but the controller 620 according to an embodiment of the present disclosure may control the first switching unit to the fourth switching unit 613a, 613b, 613c, and 613d to transmit and receive a first wireless signal through the first path and the fourth path and to transmit and receive a second wireless signal through the second path and the third path.

In this way, because the controller according to an embodiment of the present disclosure determines a communication method in consideration of a current state of the vehicle determined from state information of the vehicle, communication can be performed according to a most efficient method in a current state of the vehicle.

When four RF/antenna modules are disposed according to an embodiment of the present disclosure, the RF unit may include two baseband modules.

Figure 7:
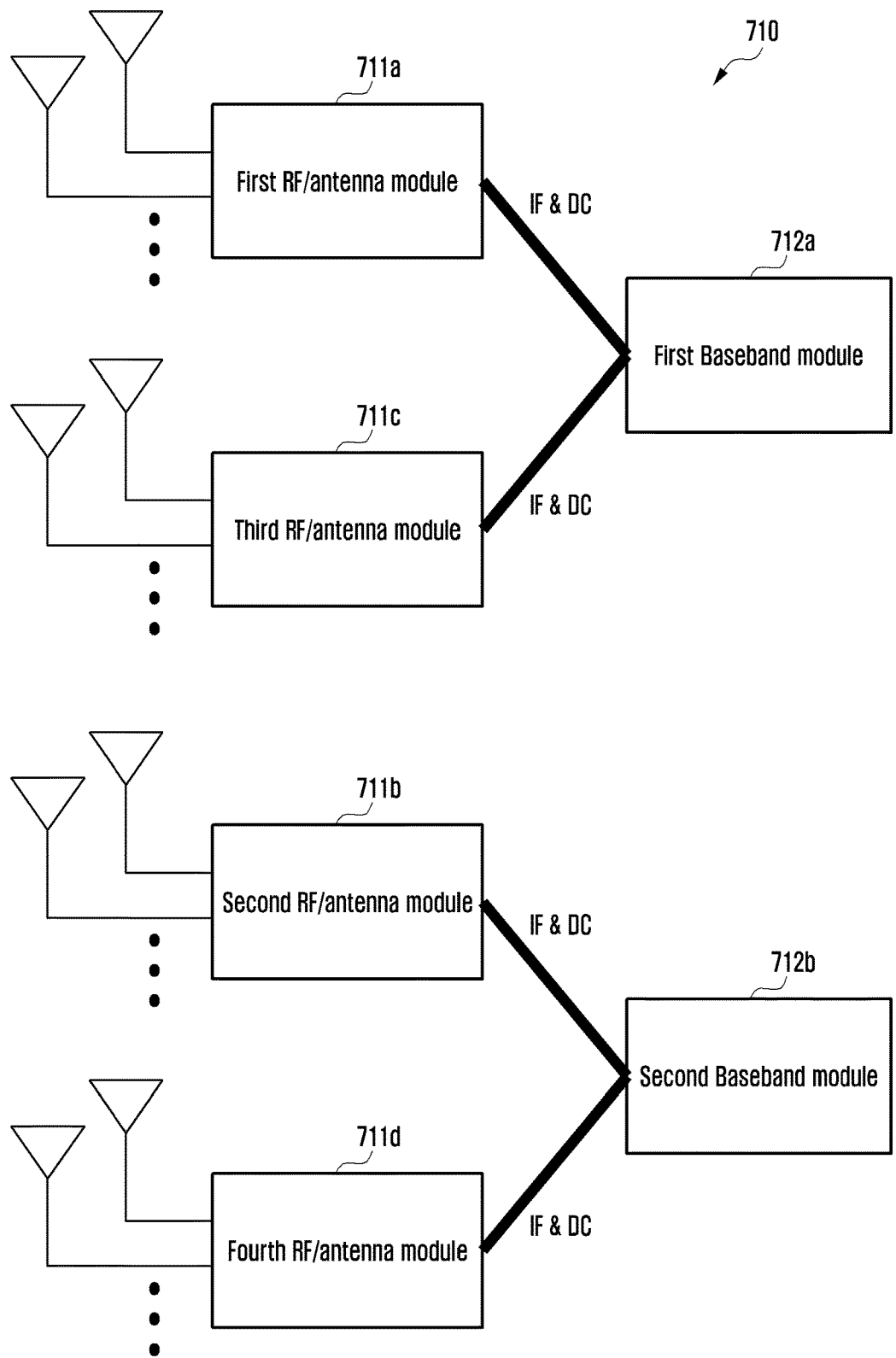
FIG. 7 is a block diagram illustrating a configuration of an RF unit including four RF modules according to an embodiment of the present disclosure.

FIG. 7 is a block diagram illustrating a configuration of an RF unit including four RF modules according to an embodiment of the present disclosure.

Referring to FIG. 7, an RF unit 710 according to an embodiment of the present disclosure may include a first RF module 711a, second RF module 711b, third RF module 711c, and fourth RF module 711d. Here, the first RF module 711a and the third RF module 711c may be disposed at a first surface forming an outer edge of the vehicle, and the second RF module 711b and the fourth RF module 711d may be disposed at a second surface forming an outer edge of the vehicle.

In order to perform more efficient communication, a baseband module according to an embodiment of the present disclosure may include a first baseband module 712a connected to the first RF module 711a and the third RF module 711c and a second baseband module 712b connected to the second RF module 711b and the fourth RF module 711d.

The baseband modules 712a and 712b each may control switching units connected between the first RF module to the fourth RF module 711a, 711b, 711c, and 711d according to a communication mode determined by the controller. Although not shown in the drawing, according to the present embodiment, a first switching unit to a fourth switching unit corresponding to the first RF module to the fourth RF module 711a, 711b, 711c, and 711d, respectively may be included.

When a vehicle according to an embodiment of the present disclosure includes a plurality of RF modules at each of a plurality of surfaces, the plurality of RF modules may be disposed at the vehicle with a method different from that of FIG. 6A.

Figure 8A:
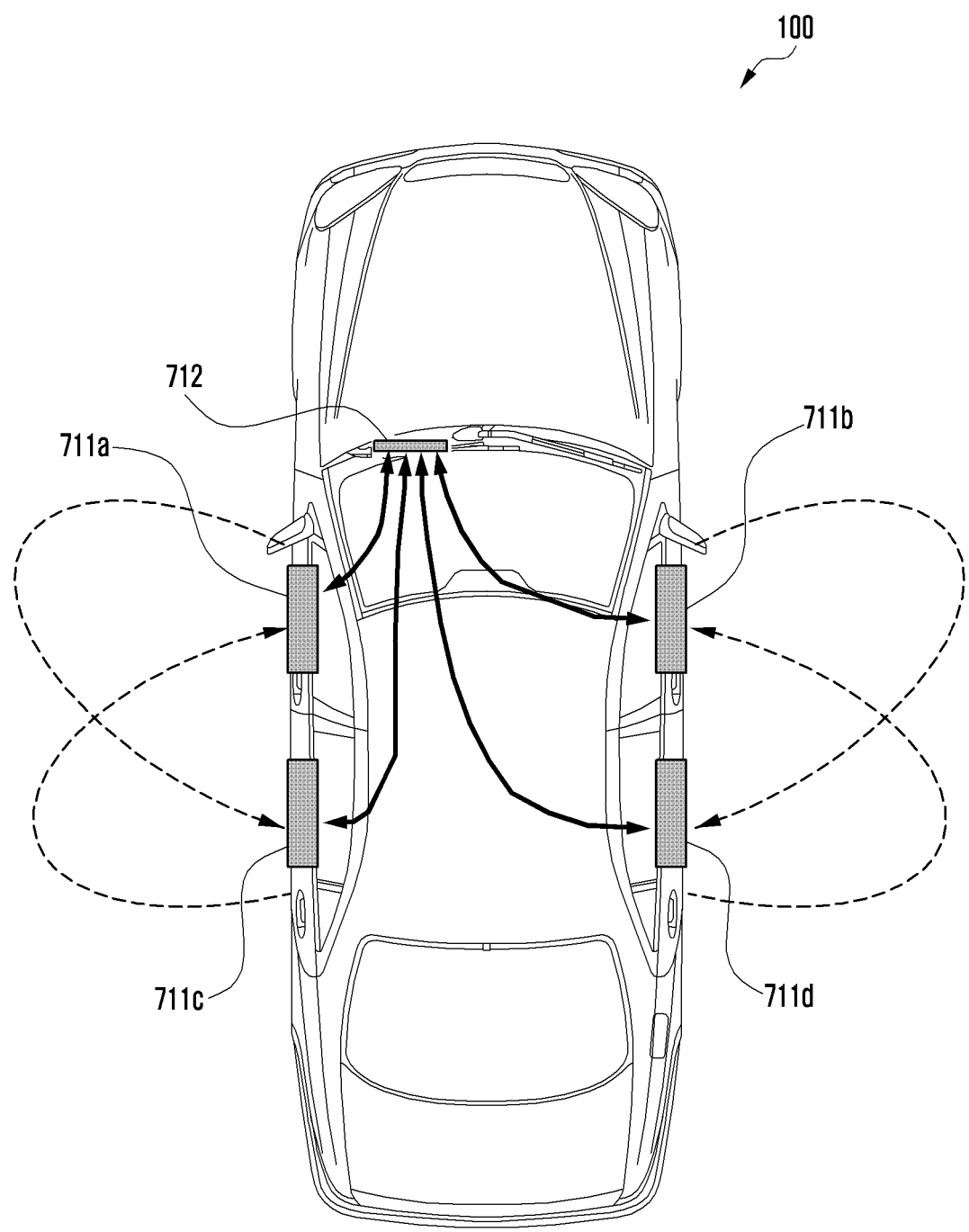
FIGS. 8A and 8B are diagrams illustrating a vehicle in which two RF modules each are placed at different surfaces of an outer edge thereof according to an embodiment of the present disclosure.
Figure 8B:
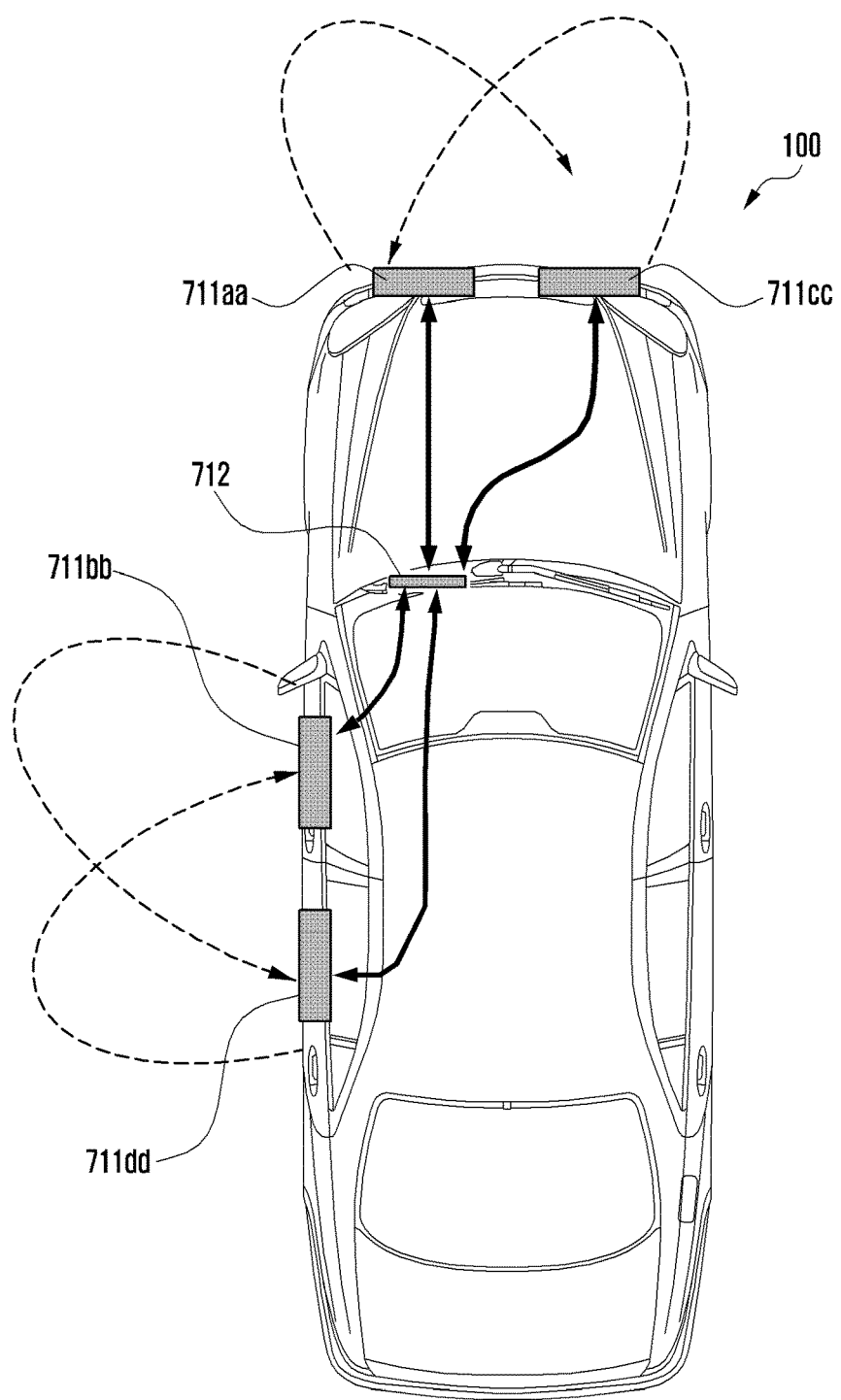

FIGS. 8A and 8B are diagrams illustrating a vehicle in which two RF modules each are disposed at different surfaces of an outer edge thereof according to an embodiment of the present disclosure.

Referring to FIG. 8A, the first RF module 711a and the third RF module 711c according to an embodiment of the present disclosure may be disposed at one surface corresponding to a side portion of the vehicle, and the second RF module 711b and the fourth RF module 711d may be disposed at another one surface corresponding to a side portion of the vehicle. In this way, when a surface in which the first RF module 711a and the third RF module 711c are disposed and a surface in which the second RF module 711b and the fourth RF module 711d are disposed are parallel to each other, a transmitting and receiving range according to the first RF module 711a and the third RF module 711c; and the second RF module 711b and the fourth RF module 711d may have an angle of 0° to 360°.

Alternatively, referring to FIG. 8B, a first RF module 711aa and a third RF module 711cc may be disposed at one surface corresponding to the front side of the vehicle, and a second RF module 711bb and a fourth RF module 711dd may be disposed at another one surface corresponding to a side portion of the vehicle. In this case, a transmitting and receiving range according to the first RF module 711aa and the third RF module 711cc; and the second RF module 711bb and the fourth RF module 711dd may have an angle of 0° to 270°.

As described above, because an RF module disposed in a vehicle according to an embodiment of the present disclosure includes at least two antenna elements, a communication distance can be increased according to a movement of the vehicle. Further, when at least two RF modules according to an embodiment of the present disclosure are disposed in a vehicle, by selecting a communication method (e.g., SISO communication, MIMO communication) most appropriate to a current vehicle state based on state information of the vehicle, more efficient communication can be performed.

While the present disclosure has been particularly shown and described with reference to embodiments thereof it will be understood by those skilled in the art that various changes in form and details may be made therein without departing from the spirit and scope of the disclosure as defined by the appended claims. Therefore, it should be understood that the foregoing embodiments are not limited but are illustrative. The scope of the present disclosure is represented by claims to be described later rather than the detailed description, and it should be analyzed that a meaning and the scope of claims and an entire change or a changed form that is derived from an equivalent concept thereof are included in the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A vehicle in a wireless communication system, the vehicle comprising:
   a transceiver comprising at least one radio frequency (RF) module, wherein each of the at least one RF module includes at least one antenna element placed on at least one surface among a plurality of surfaces forming an outer edge of the vehicle; and
   at least one processor configured to:
      identify state information of the vehicle,
      select a wireless communication method from a plurality of wireless communication methods based on the identified state information, wherein the plurality of wireless communication methods are determined based on a number of the at least one antenna element and a location of the at least one surface where the at least one antenna element is placed, and
      control the transceiver to perform the selected wireless communication method by using the at least one antenna element.

2. The vehicle of claim 1,
   wherein the at least one RF module includes a first RF module and a second RF module, at least one antenna element included in the first RF module placed on a first surface among the plurality of surfaces and at least one antenna element included in the second RF module placed on a second surface among the plurality of surfaces, and
   wherein the plurality of wireless communication methods include a single input single output (SISO) communication, a multiple input multiple output (MIMO) communication, and a diversity communication including a space diversity communication and a polarization diversity communication.

3. The vehicle of claim 2, wherein the identified state information of the vehicle comprises at least one of a driving mode of the vehicle, a speed of the vehicle, a driving route of the vehicle, a driving environment of the vehicle, or information on an operation of a component included in the vehicle.

4. The vehicle of claim 3, wherein the transceiver further comprises:
   a baseband module configured to convert a frequency of a wireless signal to a predetermined frequency;
   a first switch for connecting or opening a first path between the first RF module and the baseband module; and
   a second switch for connecting or opening a second path between the second RF module and the baseband module.

5. The vehicle of claim 4, wherein the at least one processor is further configured to:
   control the first switch to connect the first path and control the second switch to open the second path, when the at least one processor selects the wireless communication method as the SISO communication;
   control the first switch to connect the first path and control the second switch to connect the second path, when the at least one selects the wireless communication method as SISO and the diversity communication; and
   control the first switch to connect the first path and control the second switch to connect the second path, when the at least one processor selects the wireless communication method as the MIMO communication.

6. The vehicle of claim 4, wherein the transceiver further comprises:
   a third RF module including at least one antenna element placed on the first surface;
   a fourth RF module including at least one antenna element placed on the second surface;
   a third switch for connecting or opening a third path between the third RF module and the baseband module; and
   a fourth switch for connecting or opening a fourth path between the fourth RF module and the baseband module.

7. The vehicle of claim 6, wherein the at least one processor is further configured to:
- select the wireless communication method as the SISO communication, if the identified state information includes at least one of a speed of the vehicle, and a manual driving mode of the vehicle; and
- select the wireless communication method as the MIMO communication, if the identified state information includes at least one of a second speed of the vehicle faster than the first speed, and an automatic driving mode.

8. The vehicle of claim 7, wherein, if a specific region is included in an estimated driving route of the vehicle, the at least one processor is further configured to:
- change to perform the SISO and the diversity communication, when the at least one processor selects the wireless communication method as the SISO communication; and
- change to perform the MIMO and the diversity communication, when the at least one processor selects the wireless communication method as the MIMO communication.

9. The vehicle of claim 7, in case that the selected wireless communication method is the MIMO communication, wherein the at least one processor is further configured to:
- control the transceiver to use at least one first antenna element placed on a front surface of the vehicle and at least one second antenna element placed on a rear surface of the vehicle, based on the second speed of the vehicle.

10. The vehicle of claim 6, wherein the at least one processor is further configured to:
- control the first switch to connect the first path, control the second switch to open the second path, control the third switch to open the third path, and control the fourth switch to open the fourth path, when the at least one processor selects the wireless communication method as the SISO communication;
- control the first switch to connect the first path, control the second switch to connect the second path, control the third switch to open the third path, and control the fourth switch to open the fourth path, when the at least one processor selects the wireless communication method as the SISO and the diversity communication;
- control the first switch to connect the first path, control the second switch to open the second path, control the third switch to connect the third path, and control the fourth switch to open the fourth path, when the at least one processor selects the wireless communication method as the MIMO communication; and
- control the first switch to connect the first path, control the second switch to connect the second path, control the third switch to connect the third path, and control the fourth switch to connect the fourth path, when the at least one processor selects the wireless communication method as the MIMO and the diversity communication.

11. The vehicle of claim 3, wherein the at least one processor is further configured to:
- select the wireless communication method as the SISO communication, if the identified state information includes at least one of a first speed of the vehicle, and a manual driving mode of the vehicle; and
- select the wireless communication method as the MIMO communication, if the identified state information includes at least one of a second speed of the vehicle faster than the first speed and an automatic driving mode.

12. The vehicle of claim 11, in case that the selected wireless communication method is the MIMO communication, wherein the at least one processor is further configured to:
- control the transceiver to use at least one first antenna element placed on a front surface of the vehicle and at least one second antenna element placed on a rear surface of the vehicle, based on the second speed of the vehicle.

13. The vehicle of claim 3, wherein, if an estimated driving route of the vehicle comprises a specific region, the at least one processor is further configured to determine to perform the diversity communication.

14. A method of a vehicle in a wireless communication system, the method comprising:
- identifying state information of the vehicle;
- selecting a wireless communication method from a plurality of wireless communication methods based on the identified state information, wherein the plurality of wireless communication methods are determined based on a number of the at least one antenna element and a location of the at least one surface where the at least one antenna element is placed; and
- performing the selected wireless communication method by using the at least one antenna element included in each of at least one radio frequency (RF) module comprised in a transceiver of the vehicle, the at least one antenna element being placed on at least one surface among a plurality of surfaces forming an outer edge of the vehicle.

15. The method of claim 14,
- wherein the at least one RF module includes a first RF module and a second RF module, at least one antenna element included in the first RF module placed on a first surface among the plurality of surfaces and at least one antenna element included in the second RF module placed on a second surface among the plurality of surfaces, and
- wherein the plurality of wireless communication methods include a single input single output (SISO) communication, a multiple input multiple output (MIMO) communication, and a diversity communication including a space diversity communication and a polarization diversity communication.

16. The method of claim 15, wherein the identified state information of the vehicle comprises at least one of a driving mode of the vehicle, a speed of the vehicle, a driving route of the vehicle, a driving environment of the vehicle, or information on an operation of a component included in the vehicle.

17. The method of claim 16, further comprising:
- selecting to perform the SISO communication, if the identified state information includes at least one of a first speed of the vehicle, and a manual driving mode of the vehicle; and
- selecting to perform the wireless communication method as the MIMO communication, if the identified state information includes at least one of a second speed of the vehicle faster than the first speed, and an automatic driving mode.

18. The method of claim 16, in case that the selected wireless communication method is the MIMO communication, further comprising:
- performing the MIMO communication by using at least one first antenna element placed on a front surface of the vehicle and at least one second antenna element placed on a rear surface of the vehicle, based on the second speed of the vehicle.

19. The method of claim 16, further comprising:

controlling a first switch located in a first path to connect the first path between the first RF module and a baseband module that converts a frequency of a wireless signal to a predetermined frequency, and a second switch located in a second path to open the second path between the second RF module and the baseband module, when the at least one processor selects the wireless communication method as the SISO;

controlling the first switch to connect the first path and controlling the second switch to connect the second path, when the at least one processor selects the wireless communication method as the SISO and the diversity communication; and controlling the first switch to connect the first path and controlling the second switch to connect the second path, when the at least one processor selects the wireless communication method as the MIMO communication.

20. The method of claim 19, further comprising:

controlling a first switch located in a first path to connect the first path between the first RF module and a baseband module that converts a frequency of a wireless signal to a predetermined frequency, a second switch located in a second path to open the second path between the second RF module and the baseband module, a third switch located in a third path to open the third path between a third RF module and the baseband module placed in the first surface, and a fourth switch located in a fourth path to open the fourth path between a fourth RF module and the baseband module placed in the second surface, when the at least one processor selects the wireless communication method as the SISO communication;

controlling the first switch to connect the first path, the second switch to connect the second path, the third switch to open the third path, and the fourth switch to open the fourth path, when the at least one processor selects the wireless communication method as the SISO and the diversity communication;

controlling the first switch to connect the first path, the second switch to connect the second path, the third switch to open the third path, and the fourth switch to open the fourth path, when the at least one processor selects the wireless communication method as the MIMO communication; and controlling the first switch to connect the first path, the second switch to connect the second path, the third switch to connect the third path, and the fourth switch to connect the fourth path, when the at least one processor selects the wireless communication method as the MIMO and the diversity communication.

* * * * *